Feb. 1, 1966 T. LOEW ETAL 3,232,818
PROCESS OF MAKING INTERNALLY COATED METALLIZED
VINYL WELTINGS AND PRODUCT
Filed July 21, 1960

INVENTORS
THEODORE LOEW
CHARLES BROOKS
BY

ATTORNEY

United States Patent Office 3,232,818
Patented Feb. 1, 1966

3,232,818
PROCESS OF MAKING INTERNALLY COATED METALLIZED VINYL WELTINGS AND PRODUCT
Theodore Loew, Stamford, Conn., and Charles Brooks, Forest Hills, N.Y., assignors to The Cee-Bee Mfg. Co. Inc., Brooklyn, N.Y., a corporation of New York
Filed July 21, 1960, Ser. No. 44,403
16 Claims. (Cl. 161—5)

The present invention relates to internally coated metallized vinyl welting.

In forming vinyl weltings it has been found that the externally extruded surface is subject to considerable wear and it has been difficult to ornament the same or to give it distinctive and desirable finishes.

It is among the objects of the present invention to provide a surface finish for extruded vinyl materials in which a permanent finish may be applied to the surface thereof with assurance that it will not readily wear or rub off due to the readily abrasive or wearing nature of extruded surfaces.

Another object is to provide a novel method of ornamenting sheet extruded vinyl weltings or other suitable materials in which a desirable finish will be applied thereto and be maintained on the surface thereof.

Although not limited thereto, the present invention is particularly designed to provide an improved method of achieving the application of iridescent, metallized or pearlized finishes to extruded sheet materials and particularly to extruded sheet vinyl materials.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory, according to one embodiment of the present invention, to provide a pearlized finish by applying to the surface or outer edge of the extruded vinyl material a thin interiorly coated rolled ribbon or strip of the vinyl material, which is then substantially integrated with the base extrusion by subsequent forming or relaying operations.

Although the materials may be considerably varied in thickness, it has been found most satisfactory to accomplish this union with a hot extruded polyvinyl chloride material, desirably having a temperature of about 200° to 325° F. and a thickness of .050 to .300 inch. This extruded material should be relatively soft and contain a substantial plasticizer ranging from 30% to 60% of its weight.

While this is still hot, there is applied to it a thin transparent rolled strip of polyvinyl chloride, the contacting face of which has been sprayed with a still wet dispersion carrying aluminum powder, pigments, or various other finely divided iridescent, pearlized or pigmented coloring materials.

This sheet of material is desirably of 1 to 5 mils in thickness or of 10 gauge, and it is transparent so that it will take on the same color as the base extrusion when integrated therewith.

Desirably, a transparent .002 inch or .001 to .004 inch vinyl sheeting is spray-coated with a vinyl lacquer containing aluminum, bronze or pigmented powders, and then permitting a major portion of the solvent to evaporate up to the amount of 50 to 60% thereof with at least 10 to 25% solvent being retained.

Then this cold but relatively wet pearlized or metallized surface is pressed into the hot extruded vinyl base of four to ten times its thickness until a substantially integral bond has been formed, with the solvent being taken up by the extruded material and with the finely divided metal or pigment being embedded in the hot extruded faces which constitute the outside face of the final welting or strip.

Desirably, the composite sheet is then formed to give suitable conformation or decoration or suitable welting junction, whether of fabric type or of braided, woven or grain appearance.

Finally, in the preferred form of the invention, the strip is folded over so that the surfacing appears on the entire exterior thereof with the interior being bonded together to form an integral edge welting or finish.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
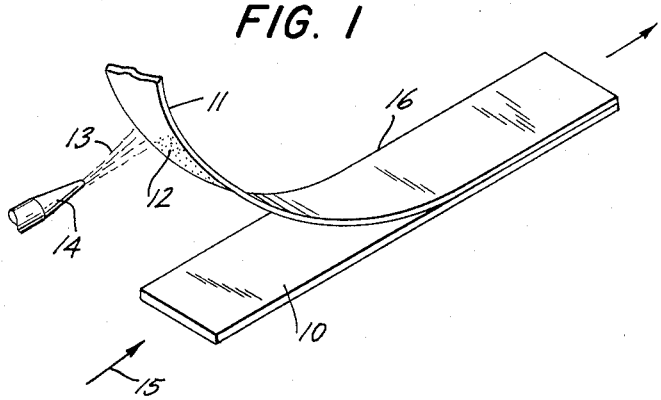
FIG. 1 is a diagrammatic top perspective view illustrating the manner of combining together the base extruded sheet and the top cover sheet.

Referring to FIG. 1, there is shown a base extruded strip 10 and a cover strip 11, to which is applied at 12 a pearlized iridescent metallized or pigmented dispersion 13 by means of a blow or spray nozzle 14.

The sheet 10 is in the condition in which it has just been extruded from the extruder indicated at about position 15, and it still contains a major portion of the heat of the extrusion and has a temperature varying between 250° and 350° F, preferably about 300° F. It may have a thickness of .050 to .30 inch.

Although shown as a flat strip, it obviously may be round, arcuate, or take other shapes following the extrusion operation.

The thin sheet 11 is not extruded, but is a thin rolled transparent membrane or film of the same width as the extruded strip 10 and may have a thickness of 1 to 5 mils or about 10 gauge in thickness.

It should be relatively cold or at room temperature as compared to the heat of the strip 10.

The organic solvent dispersion which is applied at 12 should not have the opportunity to thoroughly dry at the point of junction 16, but should still retain between 10 to 25% of the original solvent contained, so that it will be tacky when it reaches the junction point 16.

Figure 2:
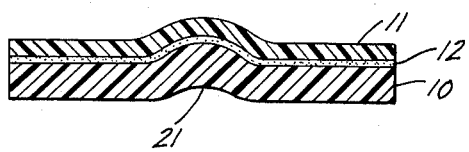
FIG. 2 is a transverse sectional view indicating these sheets being bonded together and formed by forming rollers.
Figure 4:
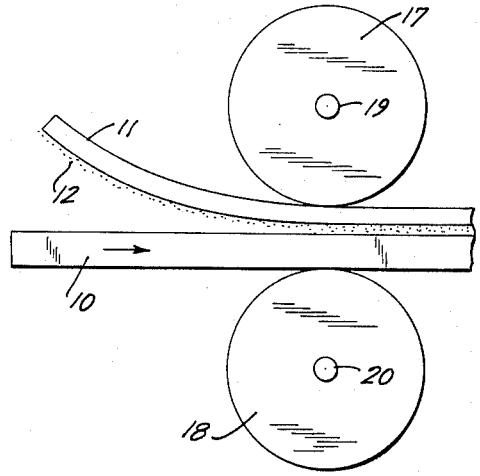
FIG. 4 is a side elevational view indicating the manner in which the junction takes place, with the pressure rollers applied thereto.

At the junction point 16, as shown in FIG. 4, there is desirably applied the pressure or forming rollers 17 and 18 on the shafts 19 and 20. These rollers will press together the cover sheet 10 with the interior facing of the ornamentation indicated at 12 under substantial pressure so as to obtain the integrated material as indicated at FIG. 2, having an upper layer 11, a lower layer or base 10 with an intermediate formation 21 designed to form the beading of the edge welting.

The intermediate decoration, as indicated at 12, will have had its solvent taken up by the extruded base 10 and the fine particles thereof will have been forced into the base 10.

In the final operation, the circular beading 22, as well as the tail attachment structure 23, will consist of the outer layer 11, constituting the thin, originally flat, non-extruded material, the base structure 10 formed of the extruded material and the intermediate ornamentation 12 which has now been integrally imbedded in the surface of the extruded material 10, which has been covered by the protective layer 11.

This welting will retain its pearlized, metallized or iridescent finish indefinitely without wearing or rubbing off and will be a most decorative type of surfacing material.

The preferred lacquer is a solution of vinyl chloride or vinyl chloride-acetate usually in cyclohexanone methylisoketone or some other suitable organic solvent in relatively small amount of 5 to 15% and the pigments, such as metallic powders from 5 to 20 microns, are dispersed therein.

The preferred procedure is to wet the pigments in finely divided form with a solvent for the vinyl with thorough agitation using about 2 to 3 parts of solvent for each part of pigments. Then a concentrated vinyl solution is added having about 25 to 30% vinyl chloride and/or acetate polymer with vigorous stirring.

Then additional solvent is added to reduce the content of the vinyl polymer to 5 to 15%, at which concentration the solution is readily flowable and sprayable.

In preference to spray coating, roller coating has been found to be very effective and in both types of application only 10 to 25% of solvent should be left, and the coating should be left merely plastic or tacky and not wet to avoid bubble formation and boiling out of solvent. This will give a non-blistered effect.

Figure 3:
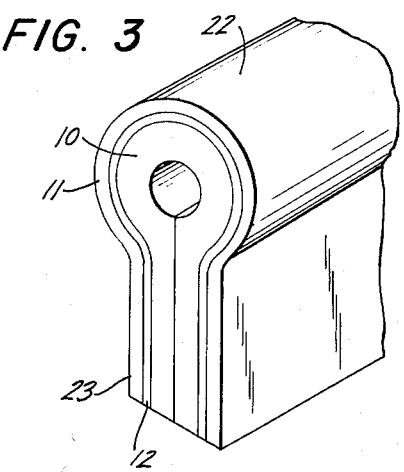
FIG. 3 is a fragmentary perspective view indicating how these sheets may be folded together and slid at their edges to form the final composite strip material.

Desirably the vinyl polymer sheeting 11 is confined to that portion of the extrusion where the ornamentation is desired and does not extend to the edges of the strip, and in FIGS. 2 and 3, it would merely cover the cylindrical or beaded portion and extend only a slight distance beyond the bend 30 into the flat stem portion 23.

Less preferably, the base may be cellulose acetate, cellulose butyrate and polystyrene, but it is not applicable to polyethylene nor to polyethylene terephthalate.

The solvent used for dispersing the pigment or metal powder must be a solvent for base vinyl polymer and be absorbed by solvent action in said base polymer, and it must also be soluble in the covering vinyl polymer film. The base polymer usually has a plasticizer content of 40% dioctylphthalate.

The composite multiply material is useful for decorative trim in automobiles, upholstery, luggage, pocketbooks and for sheets and strips in general, particularly in applications where they are subjected to abrasive wear.

It is found important that a major portion of the heat from the extrusion be retained in the polymer when the vinyl polymer sheet with the tacky coating is applied thereto.

Then the plied or combined material may be chilled by cold water to room temperature or below.

As many changes could be made in the above internally coated metallized vinyl weltings, and many widely different embodiments of this invention could be made without departure from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A method of forming a decorated integral strip material for welting and other purposes, comprising combining together a base hot extruded vinyl strip having a temperature of about 200 to 325° F. and containing from 30 to 60% of its weight in plasticizer and constituting a major proportion of the final laminate strip material and a thin non-extruded vinyl polymer cover sheet carrying on its interior face a dispersed organic solvent vinyl lacquer of a finely divided ornamenting pigment, said hot extruded strip having embedded in it the finely divided pigment and the residual solvent of said lacquer.

2. A method of forming a decorated integral strip material for welting and other purposes, comprising combining together a base hot extruded vinyl strip having a temperature of about 200 to 325° F. and containing from 30 to 60% of its weight in plasticizer and constituting a major proportion of the final laminate strip material and a thin non-extruded vinyl polymer cover sheet carrying on its interior face a dispersed organic solvent vinyl lacquer of a finely divided ornamenting pigment, said finely divided solid material consisting of a finely divided metal which is still wet with the organic solvent when applied to the base vinyl strip, said hot extruded strip having embedded in it the finely divided pigment and the residual solvent of said lacquer.

3. A method of forming a decorated integral strip material for welting and other purposes, comprising combining together a base hot extruded vinyl strip having a temperature of about 200 to 325° F. and containing from 30 to 60% of its weight in plasticizer and constituting a major proportion of the final laminate strip material and a thin non-extruded vinyl polymer cover sheet carrying on its interior face a dispersed organic solvent vinyl lacquer of a finely divided ornamenting pigment, said base extruded material serving to take up any excess organic solvent in said surfacing, said hot extruded strip having embedded in it the finely divided pigment and the residual solvent of said lacquer.

4. A decorated integral strip material having a base hot extruded vinyl strip having a temperature of about 200 to 325° F. and containing from 30 to 60% of its weight in plasticizer and constituting a major proportion of the final laminate strip material and a thin non-extruded transparent vinyl polymer cover sheet carrying on its interior face, which has been integrated with the base strip, a finely divided pigment embedded into the adjacent face of the base strip, said welting having a top rolled thin layer of vinyl chloride poylmer and a bottom thick extruded layer of vinyl chloride polymer and an intermediate vinyl lacquer residue carrying metal particles embedded into the adjacent face of the bottom layer, said hot extruded strip having embedded in it the finely divided pigment and the residual solvent of said lacquer.

5. A method of preparing an internally coated and ornamented metallized vinyl integral laminate welting, which comprises extruding a relatively heavy polyvinyl chloride material at a temperature of about 200° to 325° F. and having a thickness of .050 to .300 inch and simultaneously applying to a thin transparent rolled strip of cold polyvinyl chloride a liquid organic solvent spray containing a fine dispersion of metal particles for ornamentation purposes, said rolled strip having a thickness between 1 to 10 gauge and then applying the coated strip under pressure to the hot extruded strip at the elevated temperature to cause an integration of the extruded unrolled polyvinyl chloride materials with the hot base material absorbing any excess solvent on the spray-coated surface of the rolled strip.

6. A method of making a vinyl polymer laminate having an interiorly integrated finely divided pigment which comprises providing a relatively thick strip of hot extruded polyvinyl chloride polymer in soft extruded condition retaining the heat of the extension and having a temperature of 200 to 325° F., a thickness of .050 to .300", and containing about 30 to 60% of plasticizer, applying to one face of said strip a relatively cool rolled thin transparent strip of polyvinyl chloride polymer of about 1 to 5 mils in thickness, spray coating the adjacent face of said thin strip before application with a thin layer of a vinyl lacquer containing a suspension of pigment powder and while a substantial proportion of the solvent is still retained and the lacquer coating is wet, pressing the cold lacquer coated thin strip into the hot thick strip to cause the freely divided pigment to become embedded in the hot extruded strip and to cause the residual solvent to be taken up by the hot strip.

7. The method of claim 6, in which the lacquer contains about 25 to 30% of vinyl chloride and 5 to 15% of an organic solvent and the pigment has an average size of from 5 to 20 microns and the temperature of the base is about 300° F.

8. A vinyl laminate comprising a thin rolled facing strip of vinyl chloride polymer, a thick extruded backing strip of vinyl chloride polymer and an intermediate adhesive lacquer taken up by the backing strip and carrying finely divided pigment embedded into the face of the backing strip produced according to claim 6.

9. The laminate of claim 8, said base containing a plasticizer content of about 40% of dioctylphthalate.

10. A process of making an elongated integrated internally coated metallized vinyl polymer welting laminate having a thick hot base of extruded vinyl chloride material of .050 to 0.300 inch in thickness and a thin cold cover of a vinyl polymer strip of .001 to .004 inch in thickness of the same width as the base, said base containing 30 to 60% of plasticizer and being soft and flexible and said strip carrying on its under-face adjacent the base an organic solvent vinyl lacquer carrying a finely divided powder said process comprising applying to said face of the strip a lacquer containing at least 50 to 60% of solvent and then pressing the understrip against the base while retaining its heat of extrusion at a temperature of 200° to 325° F. and integrating the laminate into a single welting.

11. An elongated integrated internally coated metallized vinyl polymer welting laminate having a thick hot base of extruded vinyl chloride material of .050 to 0.300 inch in thickness and a thin cold cover of a vinyl polymer strip of .001 to .004 inch in thickness of the same width as the base, said base containing 30 to 60% of plasticizer and being soft and flexible and said strip carrying on its under-face adjacent the base an organic solvent vinyl lacquer carrying a finely divided powder.

12. The process of claim 11, evaporating sufficient of the solvent before integration so that 10 to 25% of the solvent will remain.

13. The strip of claim 11, said laminate being transparent and said residual lacquer being pressed into the base, said base having 4 to 10 times the thickness of the strip.

14. The strip of claim 11, said strip being formed into a rounded bead with the strip being the external surface and the base being positioned internally of the bead.

15. The process of claim 10, said underface being spray coated with the lacquer immediately over the hot extruded base and being roller pressed against the base while the underface is still wet containing at least 10 to 25% of the lacquer solvent and the metal particles being forced into the base by the roller pressure.

16. The process of claim 10, said lacquer being a vinyl chloride solution in a ketone and containing 5 to 15% of a metallic powder at 5 to 20 microns in size and the plasticizer being dioctyl phthalate.

References Cited by the Examiner

UNITED STATES PATENTS

| | | | |
|---|---|---|---|
| 2,261,578 | 11/1941 | Bauer | 161—2 |
| 2,265,436 | 12/1941 | Loblein. | |
| 2,739,919 | 3/1956 | Artyt | 154—121 |
| 2,748,019 | 5/1956 | Schramm | 154—123 |
| 2,876,575 | 3/1959 | Leika | 156—256 |
| 2,886,480 | 5/1959 | Deakin | 156—276 XR |
| 3,033,707 | 5/1962 | Lacy et al. | 156—244 XR |

FOREIGN PATENTS 555,720   1/1957   Italy.

EARL M. BERGERT, *Primary Examiner.*

CARL F. KRAFFT, *Examiner.*